(12) United States Patent
Molloy (10) Patent No.: US 7,595,805 B2
(45) Date of Patent: Sep. 29, 2009

(54) TECHNIQUES TO FACILITATE USE OF SMALL LINE BUFFERS FOR PROCESSING OF SMALL OR LARGE IMAGES

(75) Inventor: Stephen Molloy, Carlsbad, CA (US)

(73) Assignee: Qualcomm Incorporated, San Diego, CA (US)

( * ) Notice: Subject to any disclaimer, the term of this patent is extended or adjusted under 35 U.S.C. 154(b) by 513 days.

(21) Appl. No.: 11/402,661

(22) Filed: Apr. 11, 2006

(65) Prior Publication Data

US 2007/0236511 A1 Oct. 11, 2007

(51) Int. Cl.
*G09G 5/36* (2006.01)
(52) U.S. Cl. .................. 345/560; 345/545; 348/231.99
(58) Field of Classification Search .............. 345/545, 345/560
See application file for complete search history.

(56) References Cited

U.S. PATENT DOCUMENTS

| 6,473,123 B1 * | 10/2002 | Anderson ............... 348/230.1 |
| 6,954,207 B2 * | 10/2005 | Song et al. ................ 345/536 |
| 2002/0118894 A1 | 8/2002 | Morimoto et al. |
| 2005/0122347 A1 | 6/2005 | Buerkle et al. |
| 2006/0140498 A1 | 6/2006 | Kudo et al. |

OTHER PUBLICATIONS

Lin Chien-Hsin et al., "Algorithm and Architecture for Multirate Polyphase Video Scaling with Panoramic Effect and Enhanced Video Quality," Consumer Electronics, 2005, Proceedings of the Ninth International Symposium on Macau SAR Jun. 14-16, 2005, Piscataway, NJ, USA, IEEE, Jun. 14, 2005, pp. 87-92.
Illgner, Klaus, "DSPs for Image and Video Processing," Signal Processing, Amsterdam, NL, vol. 80, No. 11, 200-11-01, pp. 2323-2336.
PCT Search Report, Aug. 29, 2007.

* cited by examiner

*Primary Examiner*—Kee M Tung
*Assistant Examiner*—Michelle K Lay
(74) *Attorney, Agent, or Firm*—Michael J. DeHaemer, Jr.; George C. Pappas (57) ABSTRACT

The disclosure describes image processing techniques useful for devices that support image processing of different sized images. The techniques can be used in many contexts, and may be particularly useful for front-end image processing of small viewfinder images and large still images captured by the device. In one embodiment, this disclosure provides a method comprising capturing a first image with a device, processing the first image using line buffers sized to accommodate an image width of the first image, and capturing a second image with the device, wherein the second image has an image width larger than the image width first image. The method also includes processing the vertical stripes of the second image using the line buffers, wherein the vertical stripes of the second image define widths that fit into the line buffers.

25 Claims, 4 Drawing Sheets

TECHNIQUES TO FACILITATE USE OF SMALL LINE BUFFERS FOR PROCESSING OF SMALL OR LARGE IMAGES

TECHNICAL FIELD

The invention relates to image and video processing, and more particularly, to memory storage techniques for efficient processing of different sized images.

BACKGROUND

A number of "front-end" image processing techniques are often performed in imaging devices and video devices. Such devices typically include image sensors to capture raw image data, e.g., of individual still images or a sequence of images that form a video sequence. Image processing techniques are often performed on the raw data in order to improve image quality. Examples of such image processing techniques include 2-dimensional filtering, demosaicing, lens rolloff correction, scaling, color correction, color conversion, noise reduction filtering, and spatial filtering, to name a few. The front-end processing may improve visual image quality attributes such as tone reproduction, color saturation, hue reproduction and sharpness.

In many cases, a device may need to support image processing techniques for several different images of different sizes. Indeed, the image sizes that need to be supported by the device can vary drastically in some cases. For example, the device may present very small image sequences in real-time in the viewfinder of the device, and may need to quickly perform image processing on such images to improve image quality in the viewfinder. In addition, the device may perform the image processing techniques on much larger images, such as still images captured by the device, or a video sequence of images captured by the device. In order to support image processing for different images, conventional wisdom has mandated line buffers in the image processing modules that accommodate an image width associated with the largest images that can be processed by the device. The line buffers refer to small, temporary storage locations used to store a line or part of a line of image data. Line buffers are typically on-chip and associated with one or more processing modules.

SUMMARY

This disclosure describes image processing techniques useful for devices that support image processing of different sized images. The techniques can be used in many contexts, and may be particularly useful for front-end image processing of small viewfinder images and large still images captured by the device. The techniques described herein allow for a significant reduction in line buffer size associated with image processing. In accordance with this disclosure, line buffers may be sized to accommodate small viewfinder images so that such images can be processed very quickly. Raw data of larger images may be stored in a temporary location, and can be accessed in a manner that allows such large images to be processed using the line buffers, which are smaller than the width of the large images.

In one embodiment, this disclosure provides a method comprising capturing a first image with a device, processing the first image using line buffers sized to accommodate an image width of the first image, capturing a second image with the device, wherein the second image has an image width larger than the image width of the first image, and processing vertical stripes of the second image using the line buffers, wherein the vertical stripes of the second image define widths that fit into the line buffers.

In another embodiment, this disclosure provides a method comprising capturing an image with a device, and processing vertical stripes of the image using line buffers, wherein the line buffers define widths smaller than a width of the image.

In another embodiment, this disclosure provides a device comprising an image capture apparatus that captures an image, a memory, a memory controller that defines overlapping vertical stripes of the image, and a processing unit that processes the overlapping vertical stripes of the image using line buffers, wherein the line buffers define widths smaller than a width of the image.

In another embodiment, this disclosure provides a front-end processing unit that processes images captured by a device. The front-end processing unit processes a first image using line buffers sized to accommodate an image width of the first image, and processes vertical stripes of a second image using the line buffers, wherein the second image has an image width larger than the image width of the first image and larger than the size of the line buffers, and wherein the vertical stripes of the second image define widths that fit into the line buffers.

These and other techniques described herein may be implemented in a hardware, software, firmware, or any combination thereof. If implemented in software, the software may be executed in a digital signal processor (DSP) or other type of processor. The software that executes the techniques may be initially stored in a computer readable medium and loaded and executed in the DSP for effective processing of different sized images.

Accordingly, this disclosure also contemplates a computer readable medium comprising a computer readable medium comprising instructions that upon execution in a device cause the device to process a first image using line buffers sized to accommodate an image width of the first image, and process vertical stripes of a second image using the line buffers, wherein the second image has an image width larger than the image width of the first image and larger than the size of the line buffers, and wherein the vertical stripes of the second image define widths that fit into the line buffers.

The details of one or more embodiments of the invention are set forth in the accompanying drawings and the description below. Other features, objects, and advantages of the invention will be apparent from the description and drawings, and from the claims.

DETAILED DESCRIPTION

This disclosure describes image processing techniques useful for devices that support image processing of different sized images. The techniques can be used in many contexts, and may be particularly useful for front-end image processing of small viewfinder images and large still images captured by the device. In this case, a viewfinder mode and a still image capture mode of the device may place different processing requirements on different images captured in these different modes. Specifically, viewfinder mode may require fast processing of very small images so that the viewfinder can display such images as a real-time video sequence in the viewfinder. On the other hand, still image capture mode may tolerate larger latency, but the images are much larger than those in viewfinder mode.

In accordance with this disclosure, line buffers used for front-end image processing may be sized to accommodate image width associated with first images (e.g., viewfinder images), but may be sized smaller than second images (e.g., still images). The viewfinder images can be processed very quickly because each line of the view finder images fit within the line buffers in the processing unit. In order to process the larger images, the larger images may be addressed or otherwise defined as vertical stripes of the image, where the vertical stripes define widths that fit within the line buffers. The vertical stripes may have overlapping pixels with other vertical stripes, which is specifically useful when the image processing includes 2-dimensional (or higher dimensional) filtering. Because the same line buffers, which are smaller than the width of the still images, can be used to process small viewfinder images and large still images, a hardware reduction may be achieved in the device.

Figure 1:
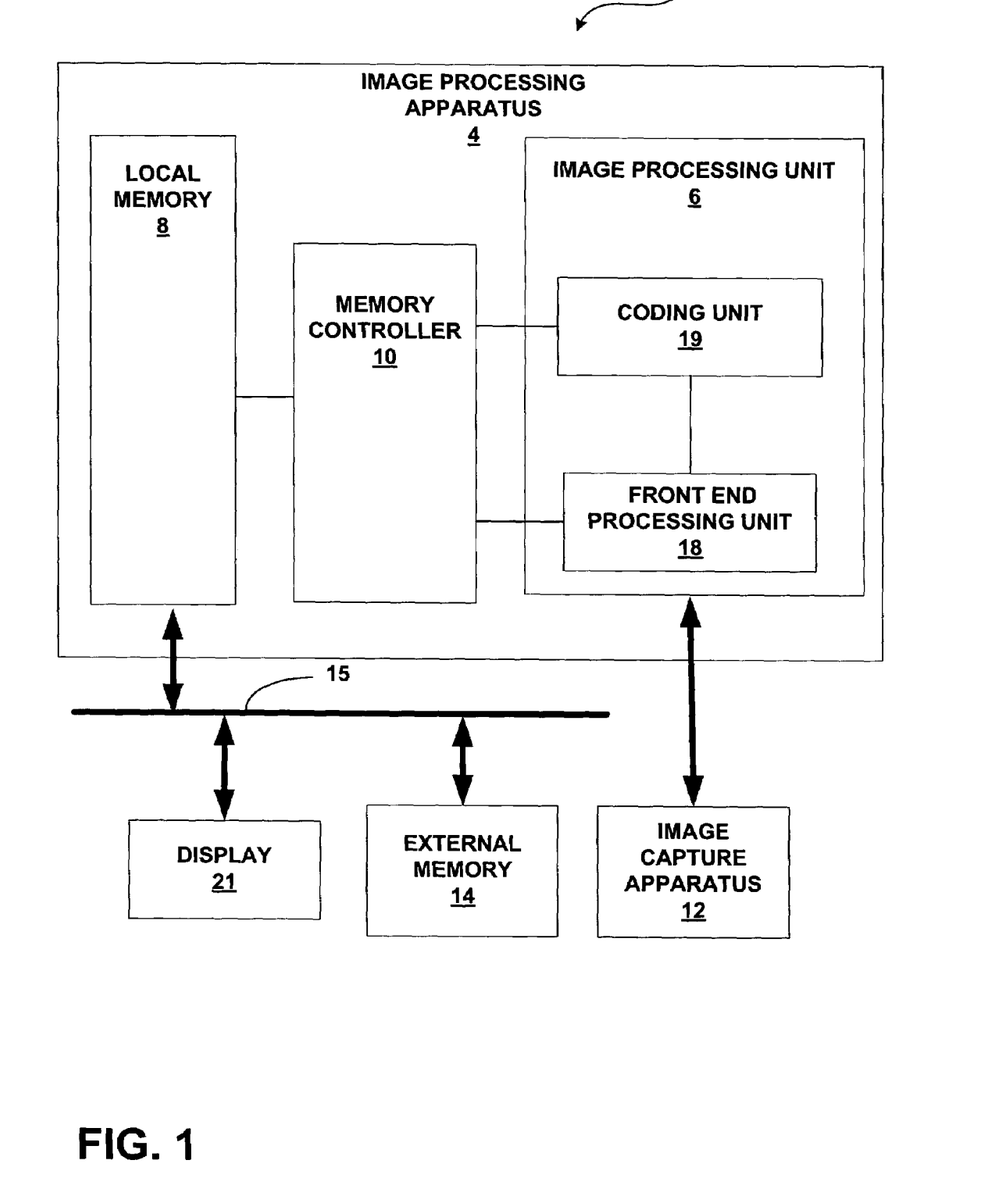
FIG. 1 is block diagram of an exemplary device that may implement the techniques of this disclosure.

FIG. 1 is a block diagram illustrating a device 2 that may implement the techniques of this disclosure. Device 2 may form part of an image capture device, or possibly a digital video device capable of coding and transmitting video data. By way of example, device 2 may comprise a digital camera, a wireless communication device such as a cellular or satellite radio telephone, a personal digital assistant (PDA), or any device with imaging or video capabilities.

As shown in FIG. 1, device 2 includes an image processing apparatus 4 to store raw image data and perform various processing techniques on such data. Apparatus 4 may comprise a so called "chip set" that includes a digital signal processor (DSP) and on-chip memory (e.g., the line buffers described herein). In other cases, however, apparatus 4 may comprise any combination of processors, hardware, software or firmware. Also, apparatus 4 may comprise a single integrated chip, if desired.

In the illustrated example of FIG. 1, image processing apparatus 4 includes a local memory 8, a memory controller 10 and an image processing unit 6. Image processing unit 6 includes a front-end processing unit 18, but may also includes a coding unit 19. Generally, front-end processing unit 18 performs the techniques of this disclosure and may include a plurality of image processing modules. Front-end processing unit 18 may include a plurality of image possessing modules. By way of example, the modules of front-end processing unit 18 may include a 2-dimensional filtering module, a demosaicing module, a lens rolloff correction module, a scaling module, a color correction module, a color conversion module, a noise reduction filtering module, a spatial filtering module, or other types of modules. The teaching of this disclosure has particular importance with respect to any modules that my implement line buffers, such as 2-dimensional filtering modules, noise reduction filtering modules and vertical scaling modules.

Coding unit 19 may be useful when the images processed by apparatus 4 are a stream of video frames. In this case, coding unit 19 may perform video coding, which may include one or more video compression techniques, such as inter-frame compression or intra-frame compression. For example, coding unit 19 may implement motion estimation and motion compensation techniques to exploit temporal or inter-frame data correlation to provide for inter-frame compression. Alternatively, or additionally, coding unit 19 may perform spatial estimation and intra-prediction techniques to exploit spatial or intra-frame data correlation to provide for intra-frame compression. Coding unit 19 may also be used to compress still images.

Local memory 8 generally stores raw image data, and may also store processed image data following any processing that is performed by image processing unit 6. Memory controller 10 controls the memory organization within memory 8. Memory controller 10 also controls memory loads from memory 8 to unit 6, and write backs from unit 6 to memory 8. Furthermore, as described in greater detail below, memory controller 10 may address the raw image data as overlapping vertical stripes. In this case, the overlapping vertical stripes may have widths smaller than the width of the larger image, so that line buffers in front-end processing unit 18 can accommodate the lines of the vertical stripes. Small images (such as viewfinder images) can be processed quickly in the line buffers, while large images (such as still images) can be addressed as overlapping stripes in memory 8 and then processed in the line buffers of front-end processing unit 18.

Accordingly, the still images may take longer to process since the full width of the image is not loaded into the line buffers at once. Instead, each large image is processed by loading a series of stripes into the line buffers. The still images, however, can more easily tolerate the added latency that may arise in this context, since the still images may not need to be delivered in real-time, e.g., as would be the case if the user is observing real-time video capture.

Device 2 may include an image capture apparatus 12 to capture images. Image capture apparatus 12 may comprise a set of image sensors that include color filter arrays (CFAs) arranged on a surface of the respective sensors, and may be coupled directly to image processing unit 6 to avoid latency in the image processing of viewfinder images. Other types of image sensors, however, could also be used to capture image data. Other exemplary sensors that could be used to realize image capture apparatus 12 include arrays of solid state sensor elements such as complementary metal-oxide semiconductor (CMOS) sensor elements, charge coupled device (CCD) sensor elements, or the like. Image capture apparatus 12 may be used to capture differently sized images, which are then processed according to this disclosure. In other cases, however, a plurality of different image capture apparatuses may be used to capture different sized images.

As noted above, some images captured by apparatus 12 may be small images, such as viewfinder images. Device 2 may include a display 21 that displays a real-time sequence of the viewfinder images sampled by apparatus 12 to simulate real-time video. These images may be relatively small in width. The line buffers in front-end processing unit 18 may be sized to accommodate the width of small view finder images. Accordingly, as such small images are captured, they may be loaded directly into front-end processing unit 18 line-by-line. After processing, the viewfinder images may be written to local memory 8 or external memory 14. The processed images may then be sent to display 21 for presentation to the user.

Display 21 may be used to display viewfinder images (as mentioned above), and may also be used to display still images following the processing of such still images by processing unit 18. In some cases, however, still images could be processed and stored without being displayed by device 2. Following the capture of a still image, local memory 8 may store raw data. Memory controller can then access vertical stripes of the raw data. The width of the still image may be larger than the width of line buffers in unit 18, but the widths of the vertical stripes may fit into the line buffers. Accordingly, once the data is organized or addressed into vertical stripes, the vertical stripes can be loaded into front-end processing unit 18 by memory controller 10, processed and written back to local memory 8 (or memory 14). Processed image data may then be stored or possibly displayed by display 21.

In some cases, device 2 may include multiple memories. For example, device 2 may include an external memory 14, which typically comprises a relatively large memory space. External memory 14, for example, may comprise dynamic random access memory (DRAM), or FLASH memory. Memory 14 may be based on the so called "NOR" or "NAND" memory technology, or any other data storage technology. In other examples, external memory 14 may comprise a non-volatile memory or any other type of data storage unit. In contrast to external memory 14, local memory 8 may comprise a smaller and faster memory space, although this disclosure is not necessarily limited in this respect. By way of example, local memory 8 may comprise synchronous dynamic random access memory (SDRAM).

In any case, memories 14 and 8 are merely exemplary, and may be combined into the same memory part, or may be implemented in a number of other configurations. In a preferred embodiment, local memory 8 forms a part of external memory 14, typically in SDRAM. In this case, both of memories 8 and 14 are "external" in the sense that neither memory is located "on-chip" with image processing unit 6. Accordingly, only the line buffers of image processing unit 6 may be "on-chip" memory. In this manner, the teaching of this disclosure can significantly reduce the amount of "on-chip" memory needed for processing of small viewfinder images and large still images.

Device 2 may also include a transmitter (not shown) to transmit the processed images or coded sequences of images to another device. Local memory 8, display 21 and external memory 14 (and other components if desired) can be coupled via a communication bus 15. A number of other elements may also be included in device 2, but are not specifically illustrated in FIG. 1 for simplicity and ease of illustration. The architecture illustrated in FIG. 1 is merely exemplary, as the techniques described herein may be implemented with a variety of other architectures.

For the smaller viewfinder images, the resulting processed pictures may be written into a "frame buffer" memory, which is usually part of external memory 14. In this case, display 21 typically reads this "frame buffer" memory to render a picture on the display screen. On larger still photo pictures, the resulting processed picture (in non-overlapping vertical stripes) are written stripe-by-stripe into the "frame buffer" memory, which again, is usually part of external memory 14. The stripes can then be combined to render a still image, which may be stored, or sent to another device, or possibly rendered on display 21. The memory location of the frame buffer memory, however, should not be limited, according to this disclosure, to any specific location.

Figure 2:
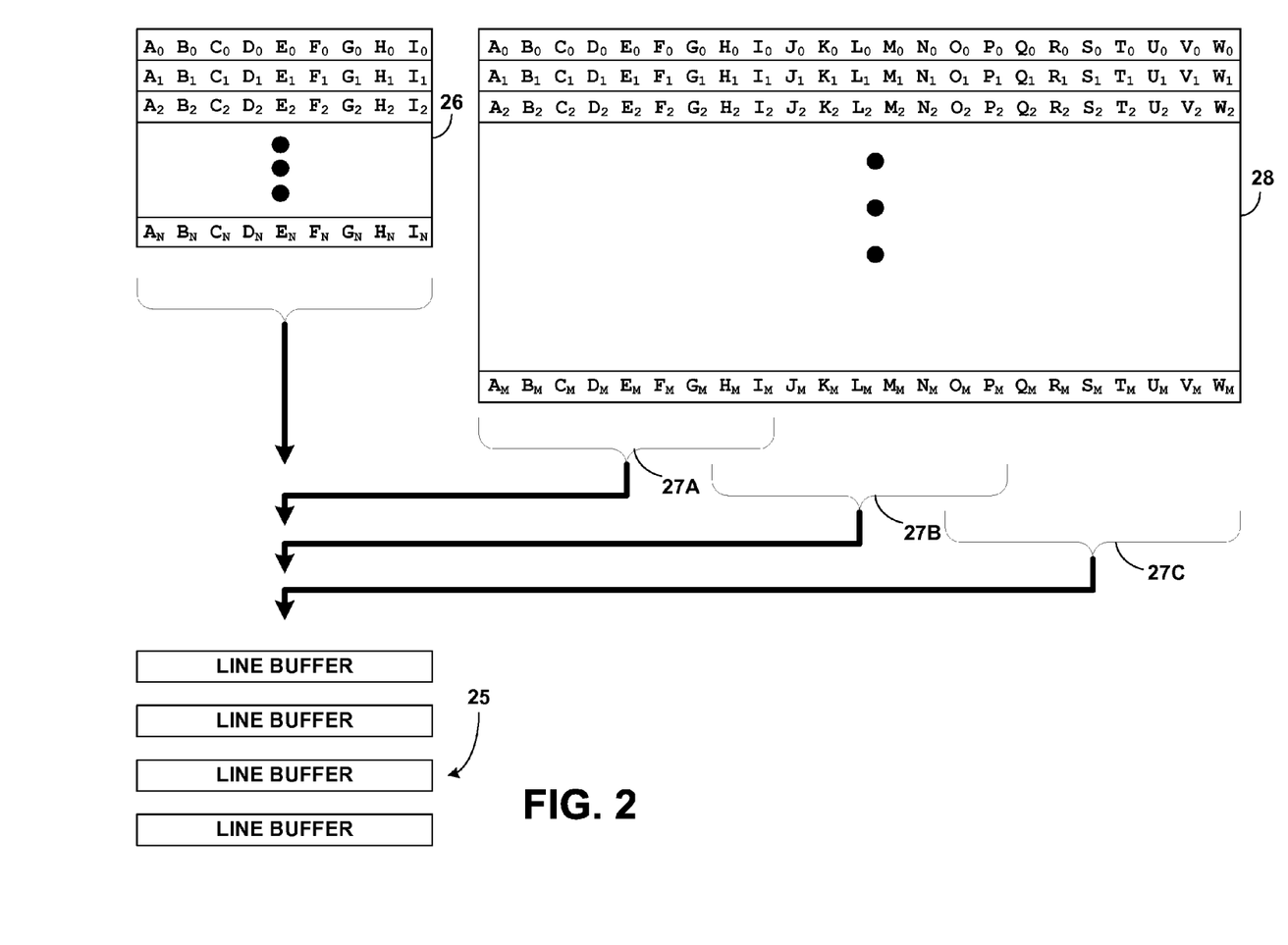
FIG. 2 is a conceptual diagram illustrating a set of line buffers sized to have a width that corresponds to a width of a first image and a width of overlapping vertical stripes of a second image.

FIG. 2 is a is a conceptual diagram illustrating a set of line buffers 25 sized to have a width that corresponds to a first image 26 and a width of overlapping vertical stripes 27A-27C (collectively vertical stripes 27) of a second image 28. More generally, line buffers 25 should have a width that accommodates the width of first image 26 and the width of vertical stripes 27. Thus, line buffers 25 may be wider than the width of first image 26 or the width of vertical stripes 27, but should be at least as wide as these respective widths in order to accommodate lines of the first image or lines of vertical stripes.

Line buffers 25 are temporary storage units, which may be on-chip elements of a DSP. If implemented in hardware, line buffers 25 may be located within one or more image processing modules of front-end processing unit 18 (FIG. 1). As shown in FIG. 2, a full line of pixels of image 26 (e.g., pixels $A_1$-$I_1$) can fit into one of line buffers 25. The actual widths needed for line buffers 25 may depend on the pixel format associated with the pixels of images 26 and 28. Many different pixel formats may be used in accordance with this disclosure, so long as the line buffers have widths to accommodate such pixel formats for the entire width of first image 26. As examples, each pixel of images 26 and 28 may comprise 8-bits or 16-bits. Also, the pixels may be represented by three-color values or four-color values in device-dependent or device-independent color spaces. Regardless of the format of the pixels, line buffers 25 can be designed to have the appropriate size, which is as large or larger than the width of image 26 and vertical stripes 27, but smaller than the width of image 28.

Again, line buffers 25 accommodate the width of small image 26 so that image 26 can be processed very quickly. Image 26 may comprise a viewfinder image that must be processed quickly as part of a real-time video sequence presented in display 21 (FIG. 1). Larger image 28 may comprise a still image (or possibly an image of a video sequence to be coded). Unlike the first, small image 26, the second, larger image 28 may tolerate longer latency in its image processing. Accordingly, system 2 utilizes this tolerance to latency by reducing the size of line buffers to be less than the width of image 28. In this case, image 28 is not processed line-by-line, but is defined into vertical stripes 27, which can be processed using line buffers 25.

In the example illustrated in FIG. 2, vertical stripes 27 are overlapping one another. Specifically, pixels H and I for each line in image 28 are included at the end of the lines in vertical strip 27A, and are also included at the beginning of the lines in vertical strip 27B. Similarly, pixels O and M are included in the lines of both of vertical stripes 27B and 27C. This overlapping arrangement of vertical stripes is particularly useful when multi-dimensional filtering is performed on image 28.

For example, 2-dimensional filtering (or other higher order filtering) may filter pixel values based in part on the values of adjacent pixels. Thus, the filtered value of pixel $C_1$ may depend not only on the value of $C_1$, but may also depend in part on the values of adjacent pixels $B_1$ and $D_1$ and possibly the values of pixels $A_1$ and $E_1$ or other pixels that are even a higher order away from the pixel $C_1$ to be filtered. In order to account for such higher order filtering in an efficient manner, vertical stripes 27 are defined to overlap one another. Following the filtering, the filtered pixels that are written back to external memory 14 (e.g., in a frame buffer) and may not be overlapping insofar as the edge-most pixels loaded into line buffers 25 may be used only to define the filtering of centermost pixels of a given vertical stripe. Thus, when processing image 28 comprises 2-dimensional filtering the overlapping vertical stripes 27 of image 28, the output of the 2-dimensional filtering may comprise filtered and non-overlapping vertical stripes, which can be stored back to memory 14 (or memory 8).

Vertical stripes 27 may be stored as separate data structures in memory 8 or an addressing scheme may be used to access the vertical stripes, as needed, from raw image data stored in memory 8. Preferably, memory controller 10 simply accesses the vertical stripes from the raw data in order to avoid the need to re-store the vertical stripes. Either way, memory controller 10 defines the vertical stripes 27 for processing in line buffers 25. Filtered versions of the vertical stripes may also be stored as separate data structures, or may be reassembled by memory controller 10 as a fully filtered image.

Figure 3:
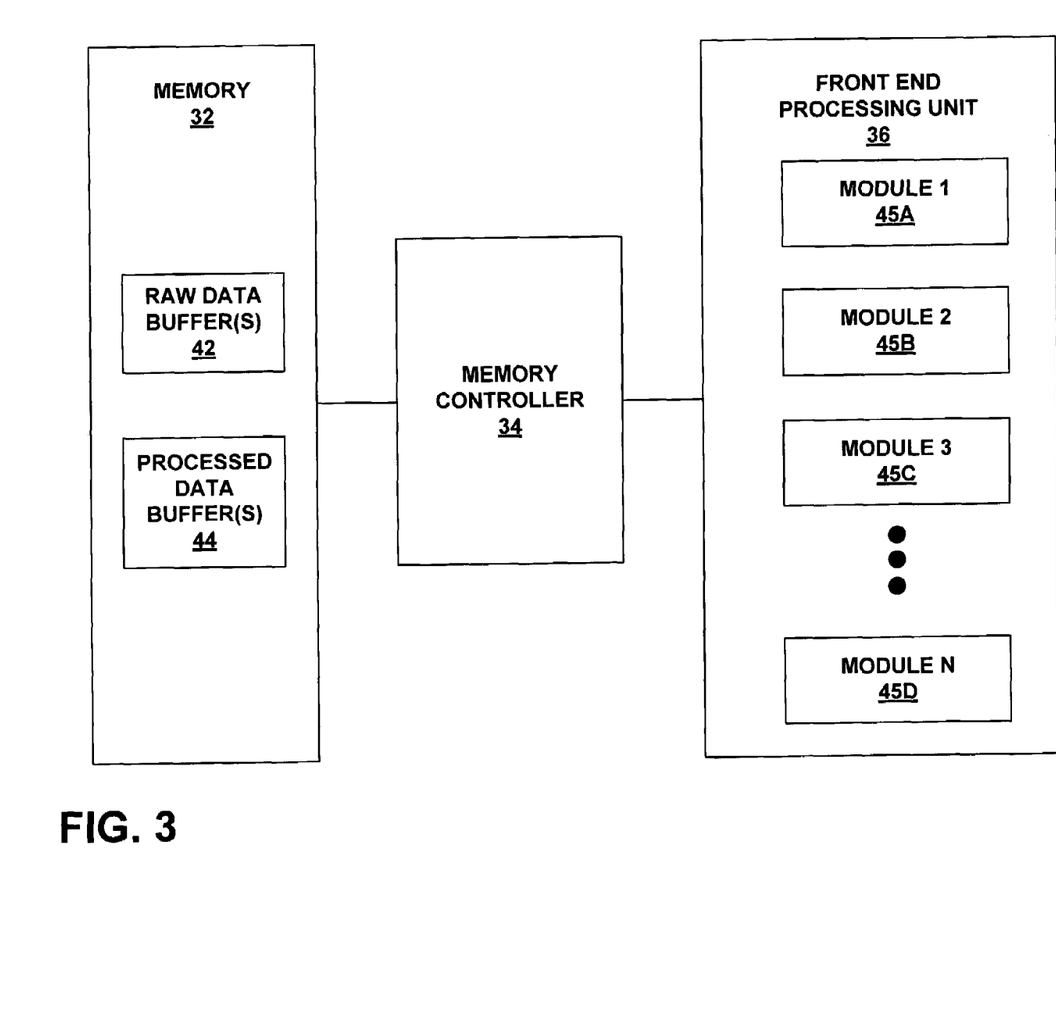
FIG. 3 is a block diagram illustrating an exemplary memory, memory controller and front-end processing unit that may implement the techniques of this disclosure.

FIG. 3 is a block diagram illustrating an exemplary memory 32, memory controller 34 and front-end processing unit 36 that may implement the techniques of this disclosure. Elements 32, 34 and 36 in FIG. 3 may correspond respectively to elements 8, 10 and 6 of FIG. 1, although such elements may be used in other devices as well. As shown in FIG. 3, memory 32 includes raw data buffers 42 and a processed data buffers 44. Raw data buffers 42 generally store raw image data, whereas processed data buffers 44 generally store data that has been processed, e.g., following one or more processing steps performed by front-end processing unit 36. Memory 32 (and the raw data buffers 42 and processed data buffers 44) could be located in a single memory location or multiple locations such as memories 8 and 14 (FIG. 1).

Memory controller 34 controls the memory organization within memory 32. In particular, memory controller 34 controls memory loads from memory 32 to unit 36, and write backs from unit 36 to memory 32. Also, for large images that define line widths larger than the line buffers used in front-end processing unit 36, memory controller 34 defines the vertical stripes for the raw data in raw data buffers 42, which fit into such line buffers. Vertical stripes 27 of image 28, which is shown in FIG. 2, is one such example.

Front-end processing unit 36 may include a plurality of image processing modules 45A-45D (collectively modules 45). One or more of modules 45 may include line buffers 25 shown in FIG. 2. Modules 45, for example, may include a wide variety of image processing modules such as a 2-dimensional filtering module or higher order filtering module, a demosaicing module, a lens rolloff correction module, a scaling module, one or more color correction modules, one or more color conversion modules, a noise reduction filtering module, a spatial filtering module, or any other type of imaging module that may be used on raw or processed image data.

For small images, such as viewfinder images that define images widths that fit within the line buffers of modules 45, memory controller 34 may load successive lines of each image into module 1 (45A) and write back the processed result into one of processed data buffers 44. The processed data may then be loaded into module 2 (45B), further processed and then written back. The further processed data may then be loaded into module 3, processed, and written back, and such processing may continue through some or all of the modules 45 in unit 36. Alternatively, for small images, the output of image capture apparatus 12 (FIG. 1) may be coupled directly to the image processing pipeline defined by unit 36, in which case the raw data for the small images would come directly from the image capture apparatus (which is not shown in FIG. 3). In this case, raw data for small viewfinder images may not pass through the memory controller 34 nor be stored in a different memory (such as 32) prior to processing in the line buffers. This may improve processing speed for such small images, which may need to be displayed in real time.

Once a given line is processed by module 1 (45A), the next line may then be processed in pipelined fashion. Accordingly, for small viewfinder images that have line widths that fit into the line buffers of modules 45, successive lines of the image can be pipelined though modules 45 for very fast image processing throughput.

Larger images may be processed in a similar fashion, but need to first be separated into vertical stripes that fit into the line buffers. Accordingly, for larger images such as still images captured by the device, memory controller 34 defines the raw data as vertical stripes (e.g., via an addressing scheme), which may overlap one another in the case of 2-dimensional filtering. In this case, a line of the vertical stripes may be loaded into modules 45 and written back in a pipelined fashion. Since each line buffer used by one or more of modules 45 are smaller than the full width of the large images, additional latency is introduced in the processing of such large images. However, the hardware reduction that is achieved by reducing the size of the line buffers is desirable at the expense of this latency, which can be tolerated in still images captured by the device. In most cases, unit 36 may process lines of each vertical stripe in a pipelined fashion without sending each of the processed lines back-and-forth through memory controller 34.

Figure 4:
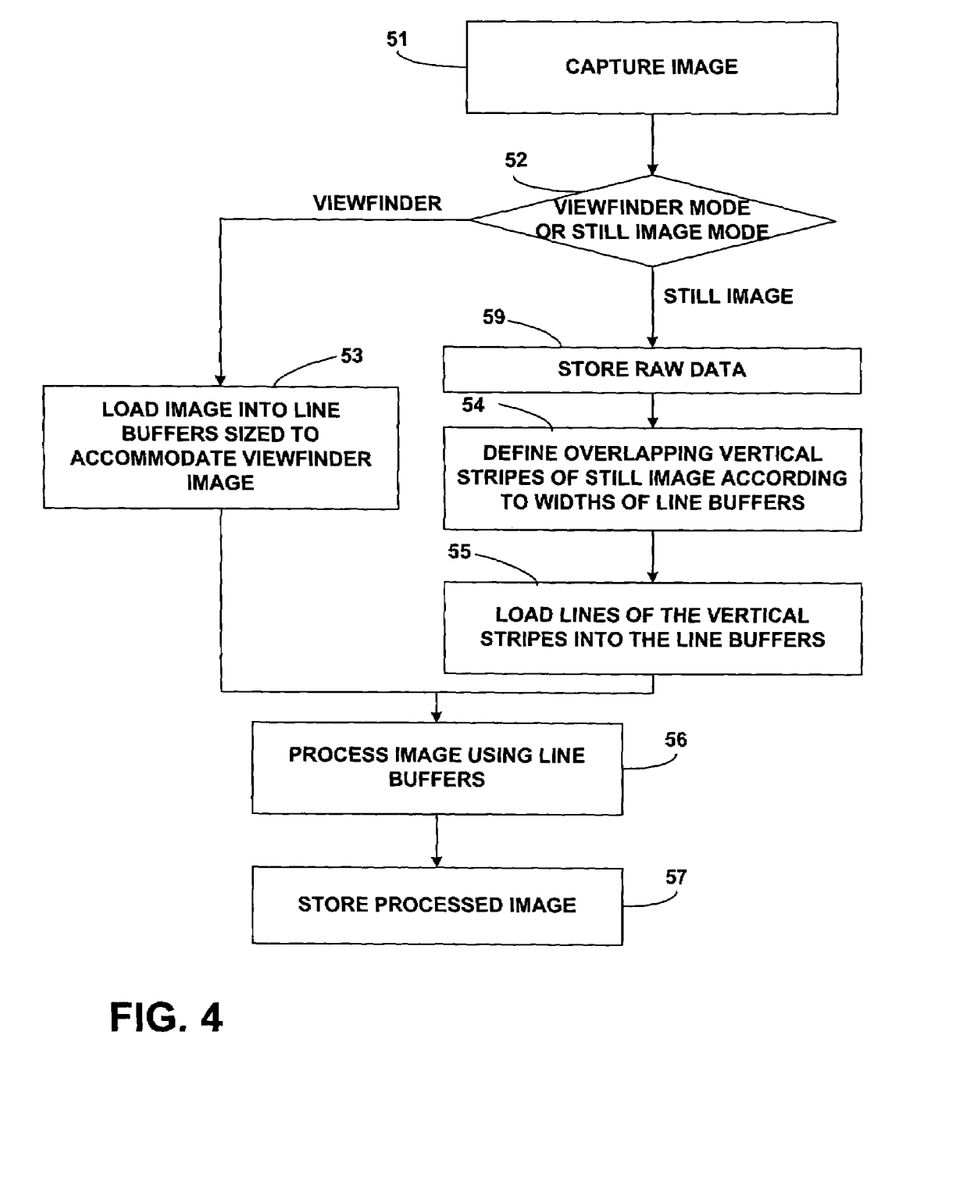
FIG. 4 is a flow diagram illustrating a technique in which small line buffers are used in the processing of large or small images.

FIG. 4 is a flow diagram illustrating a technique in which small line buffers are used in the processing of large or small images. In this example, the large images are still images captured by a device in still image mode, and the small images are viewfinder images captured by the device in viewfinder mode. The same techniques, however, could work within any images that are large and small relative to one another. FIG. 4 will be described in the context of FIGS. 1 and 2, wherein line buffers 25 of FIG. 2 are used in front-end processing unit 18 of FIG. 1.

As shown in FIG. 4, image capture apparatus 12 captures an image (51), which may be a small viewfinder image or a large still image. The mode of device 2 may determine whether the image is a viewfinder image or a still image (52). For small viewfinder images (viewfinder branch of 52), raw image data that was captured by image capture apparatus 12 is loaded directly into line buffers 25 of front-end processing unit 18. As described herein, line buffers 25 have a width that can accommodate the full width of viewfinder images, thereby allowing such images to be processed line-by-line in front-end processing unit 18. Thus, as shown in FIG. 4, front end processing unit 18 processes the image using the line buffers 25 (56). Memory controller then causes the processed image to be stored back into memory 8 (or memory 14) (57). Additional processing steps may be performed sequentially on the image, if desired.

For large still images (still image branch of 52), memory controller 10 stores raw data of the still image (59) and defines overlapping vertical stripes of the still image in a memory buffer in local memory 8 (54). The memory buffer for the vertical stripes may be sized according to the width of the line buffers, and the vertical stripes may be overlapping stripes of the still image. Memory controller 10 then loads lines of the vertical stripes into line buffers 25 of front-end processing unit 18 (55). In this manner, unit 18 can process the still image using the line buffers 25 (56), but does so for each line of the vertical stripes rather than for each line of the still image. After such processing, memory controller causes the processed image to be stored back into memory 8 (or memory 14) (57). Again, additional processing steps may be performed sequentially on the image, if desired. In other words, the process illustrated in FIG. 4 applies to one stage of image processing but could be repeated for successive stages, e.g., if front-end processing unit 18 includes several image processing modules that use line buffers. Moreover, the lines of a viewfinder image or the lines of the vertical stripes of a still image may be pipelined through front-end processing unit 18.

A number of image processing techniques have been described. The techniques may be implemented in hardware, software, firmware, or any combination thereof. If implemented in software, the techniques may be directed to a computer readable medium comprising program code, that when executed in a device that captures two or more different sized images can process such images using line buffers smaller than the widths of at least some of the images. In that case, the computer readable medium may comprise random access memory (RAM) such as synchronous dynamic random access memory (SDRAM), read-only memory (ROM), non-volatile random access memory (NVRAM), electrically erasable programmable read-only memory (EEPROM), FLASH memory, or the like.

The program code may be stored on memory in the form of computer readable instructions. In that case, a processor such as a DSP may execute instructions stored in memory in order to carry out one or more of the image processing techniques. In some cases, the techniques may be executed by a DSP that invokes various hardware components to accelerate the image processing. In other cases, the units described herein may be implemented as a microprocessor, one or more application specific integrated circuits (ASICs), one or more field programmable gate arrays (FPGAs), or some other hardware-software combination.

Nevertheless, various modifications may be made to the techniques described herein. For example, although the techniques have been described primarily in the context of small viewfinder images and large still images, the techniques may apply with respect to any images of different widths. Also, the techniques may apply with respect to higher and lower resolution images, in which case the high resolution images would be larger in width for a given image size insofar as the high resolution would define a higher pixel density than the lower resolution images. Furthermore, although the techniques have been described in the context of individual images, they could work with sets of images that form a video sequence. In this case, a low resolution sequence could be processed line by line in the buffers, while a high resoultion sequence could be stored as vertical stripes and then processed. These and other embodiments are within the scope of the following claims.

The invention claimed is:

1. A method comprising:
capturing a first image with a device in a viewfinder mode;
processing the first image using line buffers sized to accommodate an image width of the first image, wherein the line buffers are sized according to a viewfinder of the device such that each of the line buffers defines a line buffer width corresponding to the image width such that the line buffer width and the image width both correspond to images displayed by the viewfinder;
capturing a second image with the device in a still picture mode, wherein the second image has an image width larger than the image width of the first image; and
processing vertical stripes of the second image using the line buffers, wherein the vertical stripes of the second image define widths that fit into the line buffers.

2. The method of claim 1, wherein the first image comprises a viewfinder image and the second image comprises a still image.

3. The method of claim 1, wherein processing the first image comprises filtering the first image and wherein processing the vertical stripes of the second image comprises filtering the second image.

4. The method of claim 3, wherein the vertical stripes overlap one another.

5. The method of claim 4, wherein filtering comprises two-dimensional filtering of pixels of a vertical stripe using pixels of the overlapping region.

6. The method of claim 1, wherein each of the line buffers holds a number of pixels equivalent to a number of pixels displayed by the viewfinder of the device in a corresponding line of the viewfinder.

7. A method comprising:
capturing an image with a device; and
processing vertical stripes of the image using line buffers, wherein the line buffers define line buffer widths smaller than a width of the captured image, and wherein the line buffer widths correspond to images displayed by a viewfinder of the device.

8. The method of claim 7, wherein the image is a still image, the method further comprising:
capturing a viewfinder image with the device; and
processing the viewfinder image using the line buffers, wherein the widths of the line buffers exactly accommodate the viewfinder image.

9. The method of claim 7, wherein at least two of the vertical stripes comprise a common overlapping region, wherein processing the image comprises processing at least one of the two vertical stripes by 2-dimensional filtering pixels of the vertical stripe using pixels of the overlapping region, wherein output of the 2-dimensional filtering comprises filtered and non-overlapping vertical stripes.

10. A device comprising:
a viewfinder that defines a viewfinder image width corresponding to a width of images displayed by the viewfinder;
a set of line buffers that each define a line buffer width corresponding to the viewfinder image width;
an image capture apparatus that captures an image, wherein the captured image defines a width that is wider than the viewfinder image width;
a memory;
a memory controller that defines overlapping vertical stripes of the captured image; and
a processing unit that processes the overlapping vertical stripes of the captured image using the line buffers.

11. The device of claim 10, wherein the captured image comprises a still image, and wherein:
the image capture apparatus captures a viewfinder image; and
the processing unit processes the viewfinder image using the line buffers, wherein the widths of the line buffers exactly accommodate the viewfinder image.

12. The device of claim 10, wherein the processing unit performs 2-dimensional filtering on pixels of a vertical stripe using pixels of the over lapping region between two vertical stripes of the image, and wherein output of the 2-dimensional filtering comprises filtered and non-overlapping vertical stripes stored back to the memory.

13. The device of claim 10, wherein the device comprises a radiotelephone and the image capture apparatus comprises a digital camera of the device.

14. The device of claim 10, wherein the viewfinder comprises a display, the display comprising a plurality of rows of pixels of equal width, wherein each of the line buffers holds a number of pixels equal to the number of pixels of the display.

15. A front-end processing unit that processes images captured by a device, wherein the processing unit:
processes a first image using line buffers sized to exactly accommodate an image width of the first image, wherein the line buffers each define a line buffer width corresponding to the width of an image displayed by a viewfinder of the device; and processes vertical stripes of a second image using the line buffers, wherein the second image has an image width larger than the image width of the first image and larger than the size of the line buffers, and wherein the vertical stripes of the second image define widths that fit into the line buffers.

16. The front-end processing unit of claim 15, wherein the first image comprises a viewfinder image and the second image comprises a still image.

17. The front-end processing unit of claim 15, wherein the unit processes the first image by filtering the first image and wherein the unit processes the vertical stripes of the second image by filtering the second image.

18. The front-end processing of claim 17, wherein the vertical stripes overlap one another.

19. The front-end processing of claim 18, wherein filtering comprises two-dimensional filtering pixels of a vertical stripe using pixels of the overlapping region.

20. The front-end processing unit of claim 15, wherein the unit comprises a digital signal processor that executes programmable instructions.

21. A computer readable medium comprising instructions that upon execution in a device cause the device to:

process a first image using line buffers sized to exactly accommodate an image width of the first image, wherein the line buffers each define a line buffer width corresponding to the width of an image displayed by a viewfinder of the device; and process vertical stripes of a second image using the line buffers, wherein the second image has an image width larger than the image width of the first image and larger than the size of the line buffers, and wherein the vertical stripes of the second image define widths that fit into the line buffers.

22. The computer readable medium of claim 21, wherein the first image comprises a viewfinder image and the second image comprises a still image.

23. The computer readable medium of claim 21, wherein the instructions process the first image by filtering the first image and wherein the instructions process the vertical stripes of the second image by filtering the second image.

24. The computer readable medium of claim 23, wherein the vertical stripes overlap one another.

25. The computer readable medium of claim 24, wherein filtering comprises two-dimensional filtering of pixels of a vertical stripe using pixels of the overlapping region.

* * * * *

UNITED STATES PATENT AND TRADEMARK OFFICE
CERTIFICATE OF CORRECTION

PATENT NO. : 7,595,805 B2  Page 1 of 1
APPLICATION NO. : 11/402661
DATED : September 29, 2009
INVENTOR(S) : Stephen Molloy It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 684 days.

Signed and Sealed this

Twenty-eighth Day of September, 2010

David J. Kappos
*Director of the United States Patent and Trademark Office*

UNITED STATES PATENT AND TRADEMARK OFFICE
CERTIFICATE OF CORRECTION

PATENT NO.      : 7,595,805 B2                              Page 1 of 1
APPLICATION NO. : 11/402661
DATED           : September 29, 2009
INVENTOR(S)     : Molloy It is certified that error appears in the above-identified patent and that said Letters Patent is hereby corrected as shown below:

Column 10, line 53, claim 12: "over lapping" to read as --overlapping--

Column 11, line 18, claim 18: "processing of" to read as --processing unit of--

Column 11, line 19, claim 19: "processing of" to read as --processing unit of--

Signed and Sealed this
Twenty-fourth Day of May, 2011

David J. Kappos
*Director of the United States Patent and Trademark Office*